United States Patent [19]

Gyugyi

[11] 4,352,155

[45] Sep. 28, 1982

[54] VARIABLE SPEED CONSTANT FREQUENCY POWER CONVERTER WITH TWO MODES OF OPERATION

[75] Inventor: Laszlo Gyugyi, Penn Hills, Pa.

[73] Assignee: Westinghouse Electric Corp., Pittsburgh, Pa.

[21] Appl. No.: 292,975

[22] Filed: Aug. 14, 1981

[51] Int. Cl.³ .......................................... H02M 5/275
[52] U.S. Cl. ..................................... 363/163; 363/165
[58] Field of Search ............... 363/159, 160, 161, 162, 363/163, 165

[56] References Cited

U.S. PATENT DOCUMENTS

| | | | |
|---|---|---|---|
| 3,431,483 | 3/1969 | Lafuze | 363/161 X |
| 3,493,838 | 2/1970 | Gyugyi et al. | 363/163 X |
| 4,001,670 | 1/1977 | Gyugyi et al. | 363/161 X |
| 4,030,022 | 6/1977 | Bird | 363/161 |
| 4,084,223 | 4/1978 | Gross et al. | 363/161 X |

OTHER PUBLICATIONS

Gyugyi et al, "Static Power Frequency Changers", John Wiley & Sons, 1976, pp. 384–395.

Primary Examiner—William M. Shoop
Assistant Examiner—Peter S. Wong
Attorney, Agent, or Firm—G. H. Telfer

[57] ABSTRACT

When the input frequency is below a preselected value, an unrestricted frequency changer (UFC) is operated in the conventional manner by sequentially switching to more positive input phases while the fundamental component of the output waveform is positive going and to more negative input phases while it is negative going. Above the preselected input frequency, the UFC is operated in a complementary manner; that is, by switching to more negative input phases while the output waveform fundamental component is positive going and to more positive input phases when it is negative going. The switching instants occur in UFC operation when the reference waveform is equal in amplitude but opposite in slope to each waveform in a set of timing waveforms phase locked to the input waveforms. During complementary UFC operation, switching occurs when the reference waveform is not only equal in amplitude to the timing waveforms but also has a slope of the same sense.

14 Claims, 10 Drawing Figures

VARIABLE SPEED CONSTANT FREQUENCY POWER CONVERTER WITH TWO MODES OF OPERATION

CROSS-REFERENCE TO RELATED APPLICATIONS

My commonly owned, concurrently filed U.S. Patent application entitled "AC To AC Power Converter With A Controllable Power Factor" and identified as Ser. No. 293,045.

BACKGROUND OF THE INVENTION

1. Field of the Invention

This invention relates to methods and apparatus for synthesizing a single or multiphase AC output waveform of a substantially constant frequency from a multiphase input waveform of varying frequency. More particularly, it relates to control of the timing of the operation of the solid state switches which sequentially gate segments of each phase of the input waveform to the output as a function of the frequency of the input waveform.

2. Description of the Prior Art

In several applications, the production of a constant-frequency power output from a variable-frequency power source is required. One, and presently the most important, application in this category is aircraft power conversion. Here the prime source of electrical power is a rotating generator that receives its mechanical power input from the engine of the aircraft. Since the engine speed varies, usually over a 2 to 1 range, it is not possible for the generator to produce constant frequency output if coupled directly to the engine. Heretofore the general practice has been to insert a hydraulic constant-speed coupling device between the engine and the generator, thereby enabling the generator to be driven at a constant speed and hence to deliver a constant frequency power. Such a system has several disadvantages, not least of which is the relatively frequent and costly maintenance required.

An alternative system approach to aircraft power generation is to couple the generator directly to the aircraft engine, allowing it to produce a variable-frequency output power, as dictated by the engine speed. This variable frequency power is then converted to accurately regulated constant-frequency output power by means of a static frequency converter. This type of arrangement is generally referred to as a variable-speed-constant-frequency (VSCF) power generating system.

Two basic types of frequency converters have been proposed for VSCF applications. In one type of converter arrangement, the alternating voltage of the generator is converted first into a direct voltage by a (phase-controlled) rectifier circuit, then the direct voltage is converted back to alternating voltage (of the desired frequency) by a static inverter circuit. In the other type, a static frequency changer, which is capable of converting the variable-frequency alternating voltage of the generator directly into constant-frequency output voltage, is employed. The first type of arrangement is generally referred to as a DC link converter, while the second type is called a direct AC to AC frequency changer or frequency converter. Since the direct AC to AC frequency changer is capable of converting the variable-frequency generator power into constant-frequency output power in one stage, its operating efficiency is generally higher and its weight and size are usually lower, than those of its DC link type counterpart. For these reasons, the direct AC to AC frequency changer appears presently the best solution for VSCF power conversion.

Various types of direct AC to AC frequency changers have been proposed for aircraft VSCF applications. These include the naturally commutated cycloconverter (NCC), the unrestricted frequency changer (UFC), and the unity displacement factor frequency changer (UDFFC). For a detailed explanation of these frequency changers refer to pages 384 to 395 of the book "Static Power Frequency Changers" by L. Gyugyi and B. R. Pelly, John Wiley and Sons, Inc., 1976. These frequency changers have different operating and performance characteristics resulting in often mutually exclusive benefits and penalties when used in a VSCF power generating system. The major operating and performance features of these frequency changers in a VSCF power generating system can be summarized as follows.

The naturally commutated cycloconverter (NCC) employs controlled-rectifier type semiconductors (SCRs) with no intrinsic turn-off capability. These devices are commutated (turned-off) by the process of "natural commutation", by which the current is transferred without external forcing between the controlled-rectifier type circuit elements. This is achieved by proper selection of the switching instants relative to the instantaneous polarities of the input voltages, when the output voltage waveform is synthesized. Natural commutation is desirable because controlled-rectifier type devices are presently available with sufficiently high rating in small physical sizes. However, the restrictions in the output waveform construction to satisfy the conditions for natural commutation result in a lagging input power factor (at any load power factor) and in the generation of harmonic components in the output that are difficult to filter. The lagging power factor increases the rating and size of the generator; the harmonics necessitate a relatively large output filter.

The unrestricted frequency changer (UFC) requires switching devices with intrinsic turn-off capability (e.g., transistors) or an external commutating circuit. The generated output voltage waveform of the UFC is optimized for harmonic content; therefore, only a minimum amount of output filtering is needed. The phase angle of the current drawn from the generator is the negative of the load phase angle. Thus, a lagging load is seen by the generator as a leading load, and vice versa, a leading load is seen as a lagging load. In aircraft VSCF power systems, the load power factor is usually in the lagging (inductive) domain. Thus, the power factor seen by the generator is normally leading. This helps to keep the rating of the generator relatively low, close to the output rating of the UFC. However, at high generator speeds and under heavy inductive output loads, the generator may become overexcited. This may require undesirably high voltage rating for the semiconductors in the UFC or some form of external overvoltage protection. Another potential problem with the UFC is that at high generator frequencies, the switching rate of the semiconductors is rather high (that is, $f_{switching} = f_{generator} + f_{out}$), which may result in undesirably high losses.

The Unity Displacement Factor Frequency Changer (UDFFC) requires two complete converter circuits with devices having an intrinsic turn-off capability (or an external commutating circuit). The two converters are operated in a complementary fashion so that the input displacement (power) factor remains unity under all output load conditions. Thus, the generator has to supply only the real load power demand. This results in a generator rating that is minimum for a given output rating. The distortion of the output waveform is low, and thus the filtering requirement is also relatively low. The switching rate of the devices in at least one of the converter circuits is the same as in the UFC, which may cause some concern for efficiency at high generator frequencies. The greatest disadvantage of the UDFCC is the requirement for two complete power circuits, which make it unattractive in most airborne applications, except possibly in those applications where the high output requirements would make device paralleling necessary.

SUMMARY OF THE INVENTION

In all of the frequency changers above described, a reference waveform having the frequency of the desired output waveform can be used to determine the switching instants of the solid state switches. In conventional operation of an unrestricted frequency changer (UFC), the switching occurs at instants which result in switching to input phases which are more positive during periods when the reference waveform, and therefore the fundamental component of the output waveform is positive going and at instants which result in switching to input phases which are more negative during periods when the reference waveform is negative going. The unrestricted frequency changer can also be operated in what can be called a complementary mode. That is, switching can be caused to occur at instants which result in switching to input phases which are more negative during periods when the reference waveform in positive going and in switching to input phases which are more positive when the reference waveform is negative going. The complementary mode of operation results in the phase angle of the current drawn from the generator being the same as the load phase angle, and in the switching rate of the bidirectional switches being as low as possible (that is, $f_{switching} = f_{generator} - f_{out}$).

The basic concept of the invention is to operate the power converter as a UFC in the lower part of the generator frequency range, and to operate it in the complementary mode in the upper end of the generator frequency range. With this operating scheme, the generator supplies power at a leading (capacitive) power factor when the generator speed and therefore frequency is low. This reduces the excitation requirement and helps to minimize the size of the generator. The UFC type of operation also provides the best frequency spectrum attainable with an AC to AC frequency changer at low generator frequencies where the filtering of the output is the most difficult. This permits the use of an output filter of minimum size and weight. The switching rate of the bidirectional switches is also moderate because the generator frequency is relatively low.

At the upper end of the generator frequency range where the complementary mode of operation is used, the generator supplies power at a lagging (capacitive) power factor which eliminates the potential problem of self-excitation and the consequent high generator terminal voltages. The switching rate ($f_{switching} = f_{generator} - f_{out}$) of the switching devices in the converter is only moderately higher than that under conventional UFC operation ($f_{switching} = f_{generator} + f_{out}$) used in the lower part of the generator frequency range. Although the components in the output waveform obtained with the complementary operating mode have lower frequencies than those obtainable with conventional UFC operation at the same frequency, the filtering requirements essentially remain the same because of the increased generator frequency in the upper part of the speed range.

In an aircraft power generating system to which the invention may be applied, the generator speed, and therefore frequency, varies over about a 2 to 1 range. Actually, the aircraft engine runs at the two extremes most of the time: at the minimum speed on the ground, and at or close to maximum speed in the air. The intermediate speeds are generally transistional. It is therefore proposed that the converter be operated as a UFC up to a convenient, predetermined mid-frequency and that it be operated in the complementary mode above the predetermined mid-frequency.

The switching instants are determined by generating timing waveforms which are phase locked to the phases of the input waveform. When the input frequency is less than or equal to the predetermined frequency, switching occurs at instants when the reference waveform is equal to a timing waveform but is opposite in slope. Under these conditions the converter operates as a UFC. When the input frequency is above the predetermined frequency, switching occurs at instants when the reference waveform is equal to a timing waveform and has a slope of the same sense as the timing waveform. This causes the converter to operate in the complementary mode.

The reference waveform and timing waveforms can be generated in various interrelated forms. For instance, the timing waveforms and the reference waveform can all be triangular. Or, the timing waveforms can be the well known cosine waves and the reference waveform sinusoidal. As another example, the timing waveforms can be ramp functions and the reference waveform triangular. In the later two cases, two complementary reference waveforms, 180° out of phase with each other, are required. During UFC operation, the portions of the reference waveforms which have a slope opposite in sense to the slope of the timing waves are alternately compared to the timing waves. During the complementary mode of operation, the portions of the reference waveforms having a slope of the same sense as the timing waveforms are used to determine the switching instants.

In the preferred embodiment of the invention, a first train of pulses generated at the switching instants required for UFC operation is applied to a first sequencer which sequentially turns on the switches when the input frequency is equal to or less than the predetermined frequency. When the frequency of the input waveform is above the predetermined frequency a second train of pulses generated at the switching instants required for complementary operation is applied to a second sequencer which turns on the switches one at a time. The pulses are generated at the instants when the reference waveform is equal in magnitude to, and either of opposite slope or the same slope, respectively, as a timing waveform.

A three phase output can be generated by simultaneously switching to separate output lines at each switching instant segments of phases of the input waveform which are angularly displaced the same number of electrical degrees as the phases of the desired multiphase output waveform. This can be accomplished by having the sequencers simultaneously turn on the required switches.

The invention relates both to the methods and apparatus for performing the above described operations.

DESCRIPTION OF THE PREFERRED EMBODIMENTS

Figure 1:
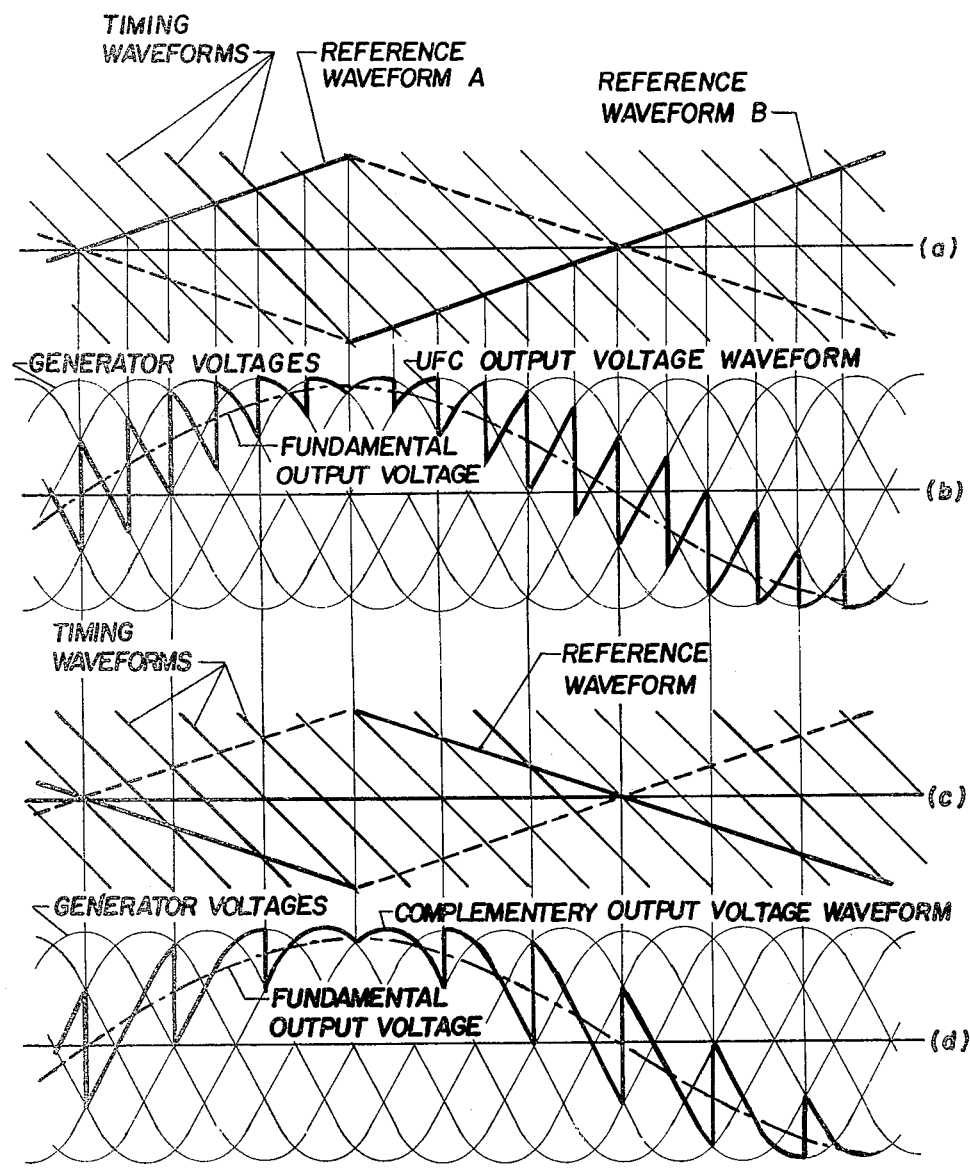
FIGS. 1(a) through (d) are waveform diagrams illustrating unrestricted frequency changer (UFC) operation and complementary UFC operation.

FIG. 1 illustrates the relationship between the output voltage waveforms of a 6-pulse unrestricted frequency converter operated in the conventional mode, waveform (b), and in the complementary mode, waveform (d). Waveforms 1(a) and (c) illustrate one way in which the switching instants for waveforms 1(b) and (d) respectively can be generated and will be discussed in more detail below.

The 6-pulse converter sequentially switches to an output line segment of each phase of a six-phase sinusoidal input waveform. The switching instants are selected such that the filtered output is a sinusoidal waveform having a fundamental component of a preselected frequency. As shown by waveform 1(b), under UFC operation the converter switches successively to input phases which are more positive during those periods when the fundamental output component is positive going and switches to input phases which are more negative when the fundamental component of the output waveform is negative going. Conversely, under complementary operation, the converter switches successively to input phases which are more negative while the fundamental component of the output waveform is positive going and to input phases which are more positive when it is negative going as shown by waveform 1(d).

The output waveform in both UFC and complementary UFC operation is produced by causing the switching devices in the converter to conduct, and therefore connect the generator voltages to the output, in sequence for a fixed period of time. Thus, the output voltage waveform is constructed from equi-length segments of the input voltages. The length (duration) of the segments is different, however for the two operating modes, and can be expressed in terms of the generator or input frequency, $f_I$, the desired output frequency, $f_o$, and the pulse-number of the converter, P, in the following way:

$$T_{UFC}=1/P(f_I+f_o), \quad (1)$$

$$T_{CUFC}=1/P(f_I-f_o), \quad (2)$$

where the subscripts UFC and CUFC indicate UFC and complementary UFC operating modes, respectively. The pulse number of the converter is the number of switching intervals per cycle of the input voltage. In the example given, the pulse number 6 corresponds to the number of input phases. However, as will be seen, this is not always so as where the phases are divided into two three-pulse groups.

The frequency, $f_{SW}$, of switching one generator voltage to the output, that is, the rate at which each switching device in the converter is operated, can be expressed for the two modes of operation as follows:

$$f_{SW(UFC)}=f_I+f_o, \quad (3)$$

$$f_{SW(CUFC)}=f_I-f_o, \quad (4)$$

In the example illustrated in FIG. 1 which we will consider to represent the minimum generator frequency, $f_I=3f_o$ and therefore the minimum switching frequencies are:

$$f_{SW(UFC)}=4f_o, \quad (5)$$

$$f_{SW(CUFC)}=2f_o, \quad (6)$$

If we now consider the maximum generator frequency for an aircraft electrical power system wherein as previously discussed the maximum frequency is typically twice the minimum, then $f_I=6f_o$ and the switching frequencies using equations (3) and (4) are:

$$f_{SW(UFC)}=7f_o, \quad (7)$$

$$f_{SW(CUFC)}=5f_o, \quad (8)$$

Since in accordance with the invention the converter is operated as a UFC at and around the minimum generator frequency (see equation 4) and is operated in the complementary manner at and around the maximum generator frequency (see equation 8), the switching frequency of the devices in the converter at maximum generator frequency is only about 25% higher than at minimum generator speed. If the transition from UFC to complementary UFC operation is made just below the mid-point of the generator frequency range, that is where:

$$f_{Imid}=(f_{Imax}+f_{Imin})/2, \quad (9)$$

the switching frequency would be:

$$f_{SW(max)}=5.5f_o, \quad (10)$$

which is about 37% higher than the minimum switching frequency (see equation 4).

As illustrated by the waveforms of FIGS. 1(b) and 1(d), the fundamental component of the output voltage waveform generated by the UFC and its complementary counterpart are identical if the time instants of the switching in the converter are properly related. This ensures that the transition between the two operating modes can be accomplished without any appreciable transients.

Figure 2:
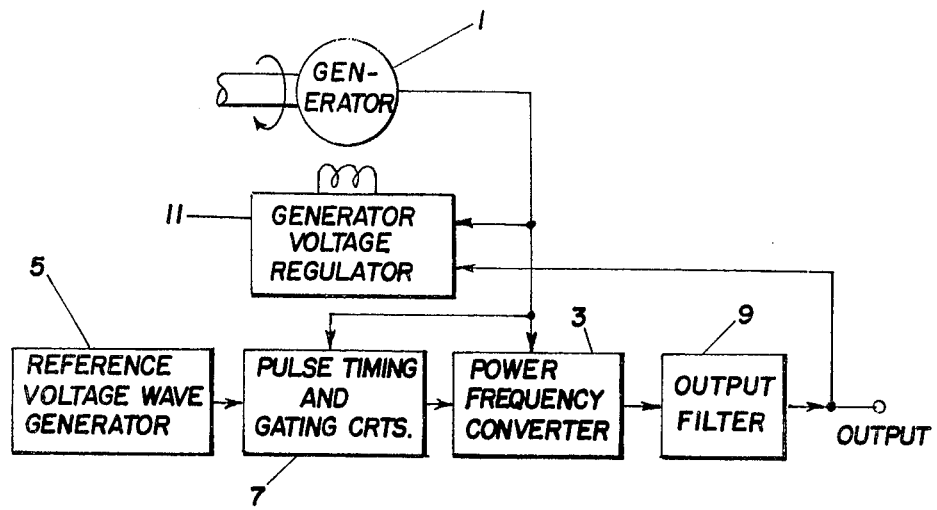
FIG. 2 is a schematic diagram in block diagram form of a frequency changer incorporating the invention.

FIG. 2 illustrates in block diagram form a variable-speed-constant-frequency (VSCF) power generating system incorporating the present invention. The generator 1 is a 6 phase AC generator driven by a prime mover, such as an aircraft engine, at variable speed. The six phases of generator voltage are each connected to a switch in a power frequency converter 3. A reference voltage wave generator 5, generates a reference waveform at the frequency of the desired output waveform. Pulse timing and gating circuits 7, generate a set of timing waves phase-locked to the generator voltages and sequentially turn on the switches in the power converter 3 at instants determined by a comparison of the reference waveform to the timing waveforms. The sequential operation of the switches in the power converter 3 produces a composite waveform made up of selected segments of each phase of the generator output. This composite waveform is passed through an L-C output filter 9 to produce the converter output having the desired frequency. The frequency of the converter output is exactly equal to that of the reference waveform. The amplitude of the output voltage can be regulated by controlling the generator voltage through a voltage regulator 11 as shown in FIG. 2. It is also possible to control the amplitude of the output voltage internally in the converter by using, for example, the technique of pulse width modulation which is described in U.S. Pat. No. 3,493,838.

Figure 3:
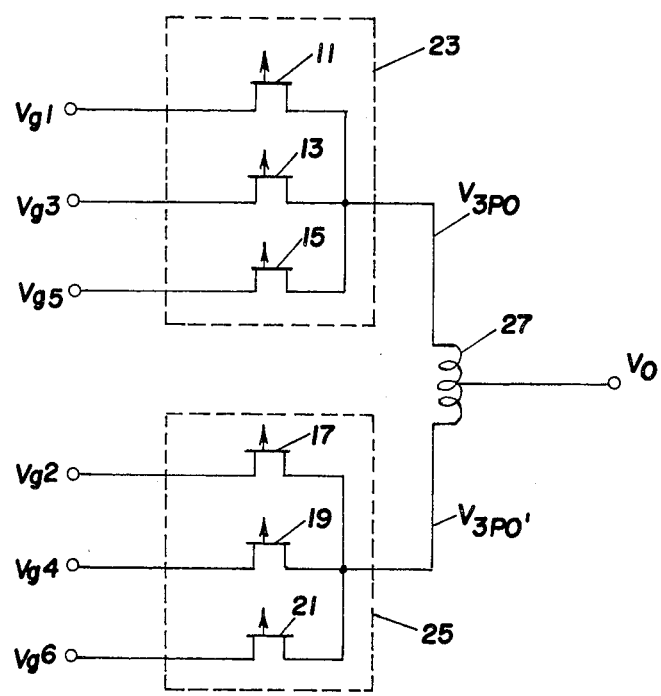
FIG. 3 is a schematic diagram of power frequency converter suitable for use in the frequency changer of FIG. 2 in which the switches are arranged in two three-pulse groups.

It is common to arrange the switches used in the power frequency converter 3 of FIG. 2 in pulse groups. For instance, as shown in FIG. 3, the six switches used to switch the six input phases $V_{g1}$ through $V_{g6}$ of the converter can be arranged in two 3-phase groups. In this arrangement, the switches 11, 13 and 15 associated with phases 1, 3 and 5 are operated as one group 23 and switches 17, 19 and 21 associated with phases 2, 4 and 6 are operated as the second group 25. The waveforms generated by each 3 pulse group are combined through an interphase transformer 27 to produce a composite output waveform $V_o$. The arrangement of the switches in pulse groups reduces the switching frequency of the individual switches.

Figure 4A:
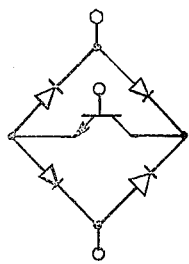
FIGS. 4a, b, c are schematic diagrams illustrating combinations of transistors and diodes forming bidirectional switches which may be used alternatively for the switches in the power frequency converter of FIG. 3.
Figure 4B:
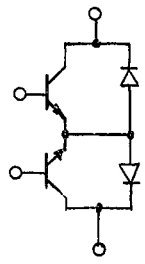
Figure 4C:
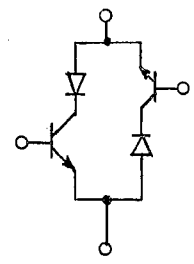

The switches are shown in FIG. 3 as symmetrical field effect transistors (FETs) with forward and reverse blocking capability. Actually any bidirectional switch of suitable power, frequency, and voltage blocking capability can be used. Thus such switches can also be realized with arrangements of transistors and diodes as for example those shown in FIGS. 4a, b and c.

Figure 5:
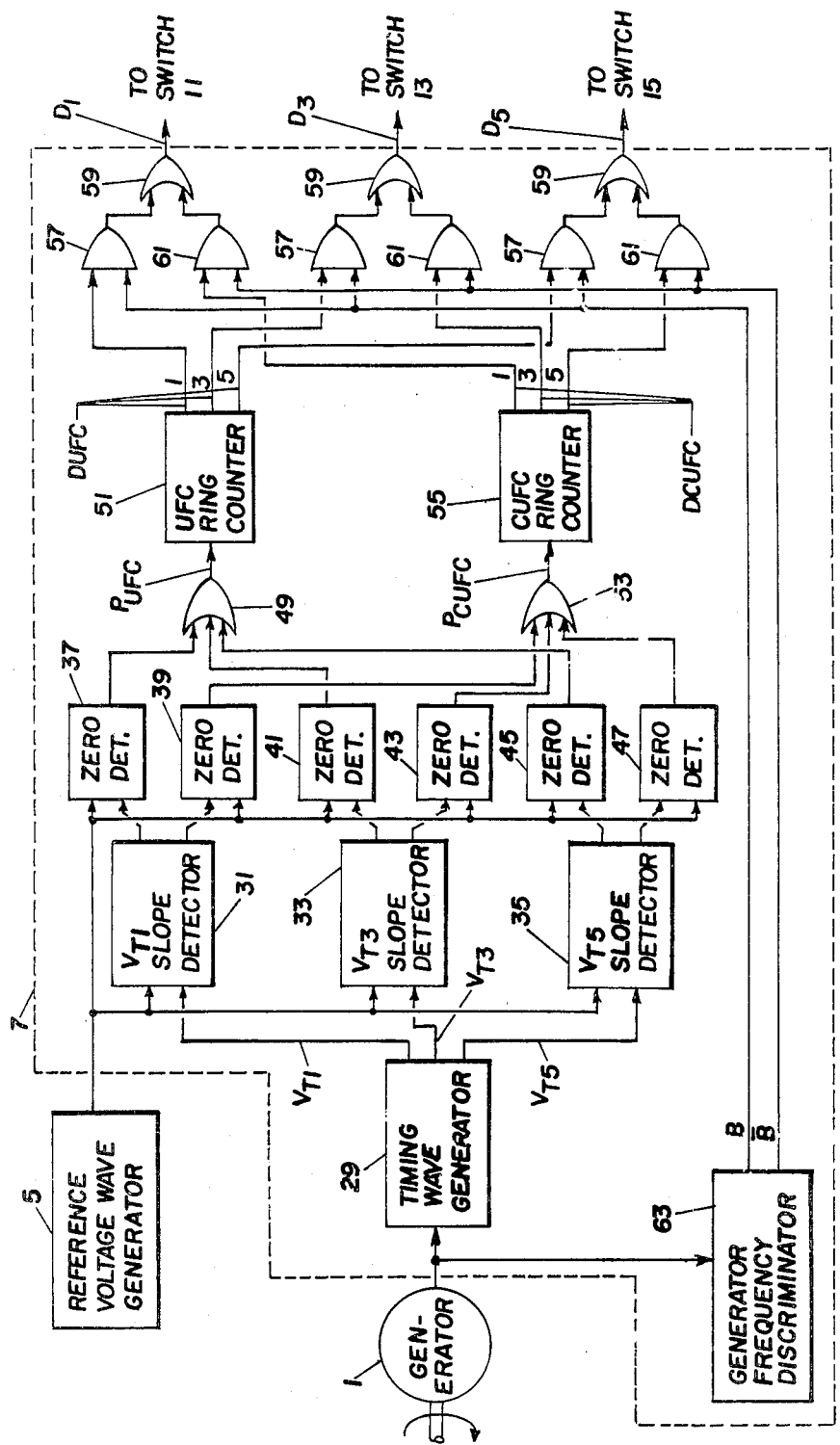
FIG. 5 is a schematic diagram of the Pulse Timing and Gating Circuits of the frequency changer of FIG. 2 according to one embodiment of the invention.

The gating signals for the switches of the power frequency converter 3 are generated by the pulse timing and gating circuits 7 of FIG. 2 in conjunction with the reference voltage wave generator 5. As previously mentioned, one way of generating the gating signals is to generate a triangular reference waveform and a set of triangular waveform timing signals. A suitable arrangement for gating the switches in this manner is shown in FIG. 5. The pulse timing and gating circuits 7 include a timing wave generator 29 which generates 6 triangular timing waves phase locked to the generator voltages. These signals can easily be generated by techniques well known by those skilled in the art such as by shaping the sinusoidal generator voltages into essentially square waves which are then integrated.

In the interests of clarity, only the remaining portions of the pulse timing and gating circuits 7 associated with the first pulse group 23 are shown in FIG. 5. Each of the timing waves $V_{T1}$, $V_{T3}$ and $V_{T5}$ is applied to a Slope Detector 31, 33 and 35 respectively which compares the slope of the tuning wave to that of the reference waveform generated by the Reference Voltage Wave Generator 5. If the slope of the timing wave $V_{T1}$ is opposite in sense to that of the reference waveform, $V_{T1}$ is gated to a Zero Detector 37. If on the other hand, the slope of the reference waveform and the timing waveform are of the same sense, $V_{T1}$ is gated to a second Zero Detector 39. Similarly, the timing waveforms $V_{T3}$ and $V_{T5}$ are gated to either Zero Detectors 41 and 45 or to Zero Detectors 43 and 47 respectively depending upon whether they have a slope which is of the opposite sense or the same sense as the reference waveform.

The zero detectors compare the amplitude of the applied timing waveform to that of the reference waveform and when they are equal a pulse is generated. Pulses generated by the Zero Detectors 37, 41, and 45 are applied through an OR element 49 to a three-state UFC Ring Counter 51 while those generated by Zero Detectors 39, 43 and 47 are applied to another three-state CUFC Ring Counter 55 through OR element 53. The ring counter 51 has three outputs each of which is connected to a gate drive circuit for one of the FETs 11, 13 or 15 through an AND element 57 and an OR element 59. In a similar manner, the three outputs of ring counter 55 are each connected to the gate drive circuit for one of the FETs of the group through the OR element 59 and a second AND element 61. A Generator Frequency Discriminator 63, which monitors the frequency of the voltages generated by the generator 1, supplies a second gating signal B to AND elements 57 and $\bar{B}$ to AND elements 61. The signal $\bar{B}$ is high when the generator frequency is at or below a predetermined frequency while the signal B is high when the frequency exceeds the predetermined value. Thus, when the generator frequency is below the predetermined value, the switches 11, 13 and 15 are controlled by the UFC Ring Counter 51 which sequentially turns these switches on one at a time as the counter is pulsed. On the other hand, sequential operation of these switches is controlled by the CUFC Ring Counter 55 when the generator frequency is above the predetermined value and $\bar{B}$ is high. The counter 51 is designated the UFC Ring Counter since it is pulsed when the reference signal and a timing waveform are equal in amplitude but opposite in sense and this condition produces conventional UFC operation. Ring counter 55 on the other hand produces complementary UFC operation and is therefore designated the CUFC Ring Counter.

Figure 6:
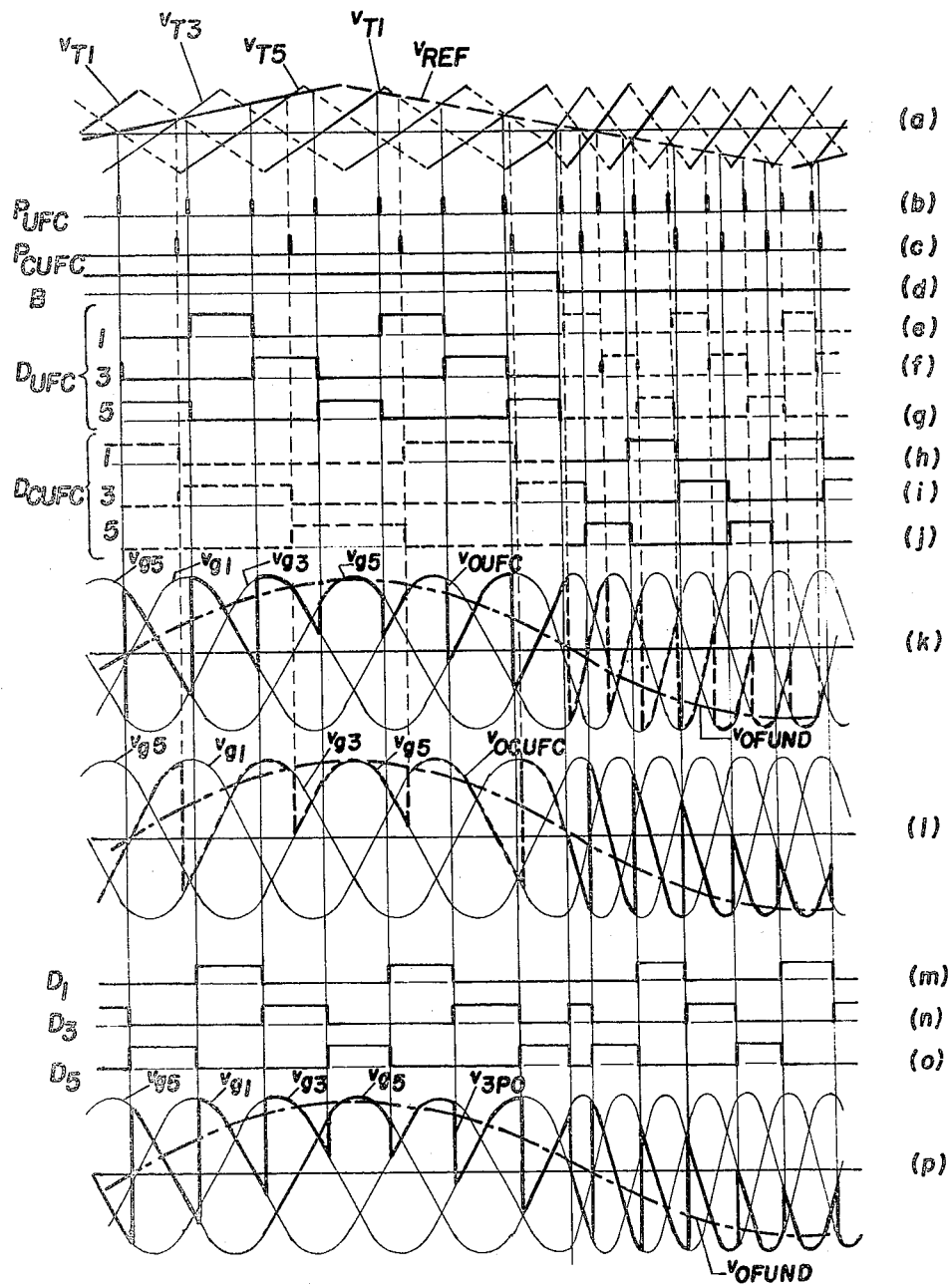
FIGS. 6(a) through (m) are waveform diagrams illustrating the operation of the circuits of FIG. 5.

Operation of the circuit of FIG. 5 can be better understood by reference to FIG. 6 which is a waveform diagram illustrating the signals that are generated at various points in the circuit. Waveform 6(a) illustrates the relationship between the reference waveform $V_{REF}$ generated by the Reference Voltage Wave Generator 5 and the timing waveforms $V_{T1}$, $V_{T3}$ and $V_{T5}$ generated by the Timing Wave Generator 29. The portions of these waveforms with a negative slope are shown in dotted line form only for clarity. For purposes of illustration, the frequency of the generator and therefore of the timing waveform signals is higher in the right side of the diagram.

The waveform shown at 6(b) is the pulse train PUFC which is applied to the UFC Ring Counter 51 as also indicated in FIG. 5. Similarly, waveform 6(c) represents the pulse train PCUFC applied to CUFC Ring Counter 55. Waveform 6(d) illustrates the signal B which is high on the left side of the Figure indicating that the generator frequency is below the predetermined mode switching frequency, but goes low to initiate a transfer to complementary operation in the right side of the figure.

Waveforms 6(e), (f) and (g) represent the UFC operation drive signals, DUFC, appearing at the three outputs of the UFC Ring Counter 51. In like manner, waveforms 6(h), (i) and (j) represent the complementary operation drive signals, DCUFC, generated by CUFC Ring Counter 55. The portions of these waveforms which are selected for driving the converter switches are shown in full line while the unselected portions are shown in dashed lines. Thus during UFC operation shown in the left side of the figure, the DUFC waveforms are shown in full line while the DCUFC waveforms appear in dashed lines with the representations reversed during complementary operation shown in the right side of the figure.

Waveform 6(k) illustrates the three-pulse unfiltered output waveform, $V_{DUFC}$, generated during UFC operation. Portions of the generator phase voltages $V_{g1}$, $V_{g3}$ and $V_{g5}$ are switched to the output in accordance with the pattern of the drive signals DUFC shown in waveforms (e), (f) and (g). Similarly, waveform 6(e) illustrates the unfiltered three-pulse waveform generated during complementary UFC operation again with the selected portion shown in full line and the unselected portion in dashed line.

Waveforms 6(m), (n) and (o) represent the three drive signals $D_1$, $D_3$ and $D_5$ generated by the circuit of FIG. 5 at the outputs of the OR elements 59. They illustrate that with the signal B high indicating low generator frequency, the DUFC signals are selected to drive the bidirectional switches of the converter and that the DCUFC signals become the drive signals during complementary operation when the B signal is low and generator frequency is high. The final waveform (p) in FIG. 6, illustrates the three pulse output waveform $V_{3PO}$ generated by the three pulse group 23 shown in FIG. 3. A similar three pulse waveform $V_{3PO}'$ derived from generator voltages $V_{g2}$, $V_{g4}$ and $V_{g6}$ is simultaneously generated by three-pulse group 25 with these two signals being combined by the interphase transformer 27 to produce the output signal $V_o$. $V_{OFUND}$ appearing in waveforms 6(k), (l) and (p) represents the fundamental component of this output waveform $V_o$.

The drive signals for the switches of three-pulse group 25 are generated by a circuit which uses the reference waveform from the Reference Voltage Generator 5, the B and $\overline{B}$ signals from the Generator Frequency Discriminator 63, the $V_{T2}$, $V_{T4}$ and $V_{T6}$ timing signals from the Timing Wave Generator 29 and circuitry identical to the remaining components in FIG. 5.

Figure 7:
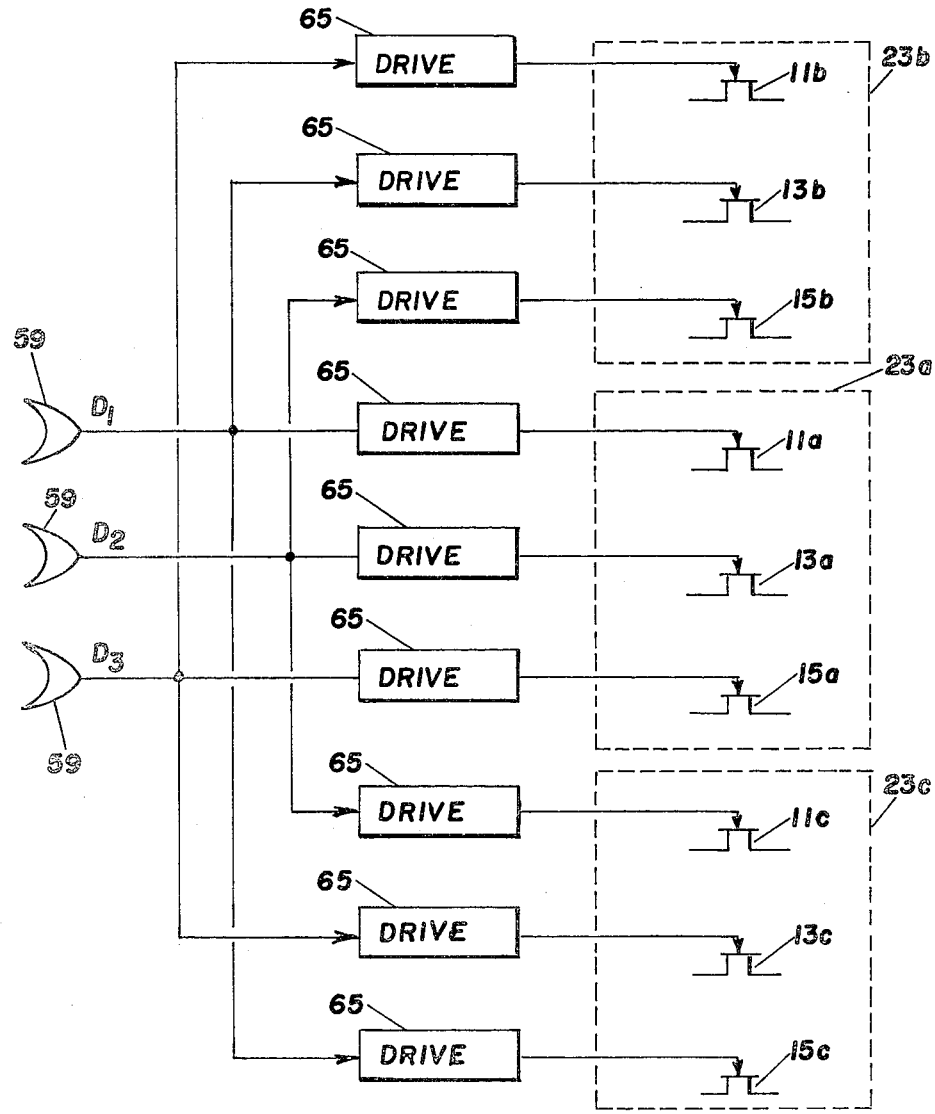
FIG. 7 is a schematic diagram illustrating circuitry for generating a three-phase output waveform from the circuit of FIG. 5.

FIG. 7 illustrates a circuit for generating a three-phase output waveform in accordance with the invention. In this arrangement, the Drive signals $D_1$, $D_3$ and $D_5$ generated by the OR elements 59 of FIG. 5 simultaneously turn on through drive circuits 65 bidirectional switches in three, three-pulse groups 23a, b and c each associated with one of the output phases.

Figure 8:
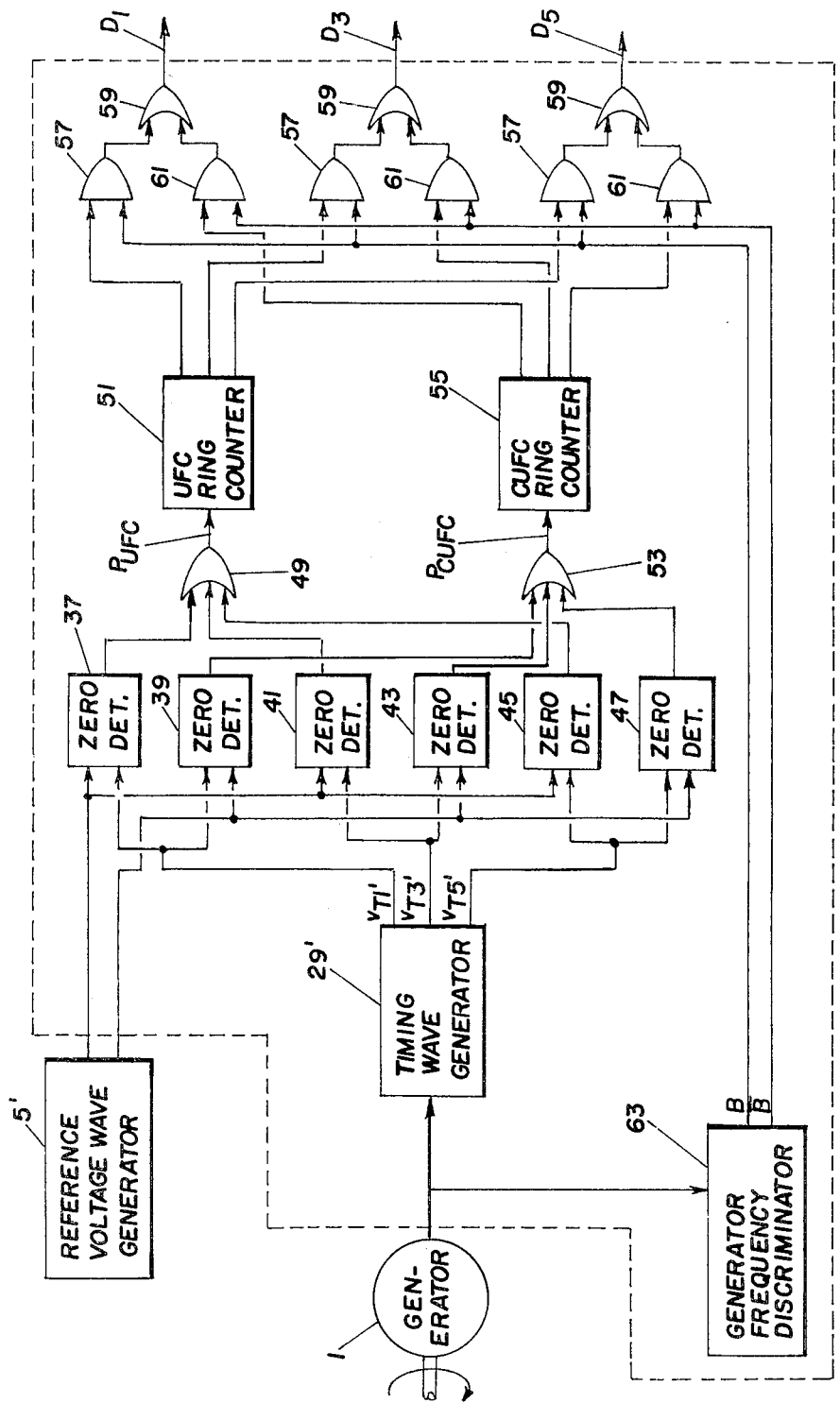
FIG. 8 is a schematic diagram of the Pulse Timing and Gating Circuits of the frequency changer of FIG. 2 according to another embodiment of the invention.

Returning to FIG. 1, the timing waveforms illustrated are ramp functions which are phase locked to the phase voltages of the generator. In using this type of timing waveform, two triangular reference waveforms A and B must be generated. These waveforms have the same frequency but are 180° out of phase. During UFC operation the positive sloped portions of the two reference waveforms are compared with the timing waveforms to determine the switching instants. During complementary UFC operation the negative slopes are used. FIG. 8 discloses a circuit for generating the switching signals using this pattern of timing and reference waveform. The components in FIG. 8 which are identical to those in FIG. 5 use the same reference characters. Those that are related but modified utilize primed reference characters. The Reference Voltage Wave Generator 5 generates the two reference waveforms A and B and applies the positive sloping segments of these waveforms to Zero Detectors 37, 41 and 45 and the negative sloping segments to Zero Detectors 39, 43 and 47. Timing Wave Generator 29' generates the negatively sloped, ramp timing signals $V_{T1}'$, $V_{T3}'$ and $V_{T5}'$ and applies each of these signals to a zero detector in each group. The remaining circuitry of FIG. 8 is the same as FIG. 5 and operates in the same manner. Thus, UFC Ring Counter 51 is pulsed each time a timing signal is equal in amplitude to the positively sloped segments of the timing waves and CUFC Ring Counter 55 is pulsed when the timing signals is equal in amplitude to a negatively sloped segment of the reference waveform. If cosine wave timing signals were used, the circuit of FIG. 8 would be used with the Reference Voltage Wave Generator 5' generating two sinusoidal reference waveforms.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the appended claims and any and all equivalents thereof.

I claim:

1. In a method for synthesizing from an essentially sinusoidal multiphase AC input waveform of varying frequency, an output waveform of a substantially constant desired frequency by sequentially switching, at intervals which are short in duration compared to the frequency of the input waveform, to successive phases of the input waveform to generate an output waveform having a fundamental frequency equal to the desired output frequency, the improvement comprising:

operating in a first mode by switching to input phases which are successively more positive when the fundamental of the output waveform is positive going and to input phases which are successively more negative when the output waveform is negative going, operating in a second mode by successively switching to input phases which are more negative when the fundamental of the output waveform is positive going and to input phases which are more positive when the output waveform is negative going;

determining the frequency of the multiphase input waveform; and selecting the first mode of operation when the frequency of the multiphase input waveform is equal to or less than a preselected frequency and selecting the second mode of operation when the frequency of the multiphase input waveform is greater than said preselected frequency.

2. The method of claim 1 wherein said preselected frequency is about the midpoint of the frequency range of the multiphase input waveform.

3. The method of claim 2 wherein the frequency of the multiphase input waveform varies over a ratio of 2 to 1.

4. The method of claim 1 wherein the switching to successive input phases in the first and second modes of operation are phase related such that the fundamental component of the output waveforms generated in the first and second modes of operation are in phase.

5. A method of synthesizing from a multiphase AC input waveform of varying frequency, an output waveform of substantially constant frequency, said method comprising the steps of:

generating a set of timing reference waveforms phase locked to the phases of the multiphase input waveform;

generating an output reference waveform having a frequency equal to the fundamental component of the desired output frequency;

comparing the slope and amplitude of the timing waveforms to those of the reference waveform;

determining the frequency of the multiphase input waveform;

generating the output waveform while the frequency of the input waveform is equal to or below a preselected value by successively switching to another phase of the input waveform at instants when the reference waveform and a timing waveform are equal in amplitude but opposite in slope, and generating the output waveform while the frequency of the input waveform is above said preselected value by successively switching to another phase of the input waveform at instants when the reference waveform and a timing waveform are equal in amplitude and have slopes of the same sense.

6. The method of claim 5 wherein the step of generating the timing waveforms comprises the step of generating triangular timing waveforms having the same frequency as the input waveform and wherein the step of generating the reference waveform comprises the step of generating a triangular reference waveform having the same frequency as the fundamental component of the desired output waveform.

7. The method of claim 5 wherein the step of generating the timing waveforms comprises the step of generating ramp function timing waveforms and wherein the step of generating a reference waveform comprises the steps of generating two triangular reference waveforms 180° out of phase with each other and each having a frequency equal to the frequency of the fundamental component of the desired output waveform and selecting the segments of the reference waveforms having a slope opposite in sense to the slope of said ramp timing waveforms for comparing with the timing waveforms when the frequency of said input waveform is equal to or less than said preselected value and selecting the segments of the reference waveforms having a slope of the same sense as the slope of said ramp function timing waveforms for comparison with the timing waveforms when the frequency of the input waveform is above said preselected value.

8. The method of claim 5 including generating a multiphase output waveform of the desired frequency by simultaneously switching to separate output lines at each switching instant segments of phases of the input waveform which are angularly displaced the same number of electrical degrees as the phases of the desired multiphase output waveform.

9. A frequency changer for synthesizing an output line, an output waveform of a desired substantially constant frequency from segments of a multiphase input waveform of varying frequency comprising, a bidirectional switch connected between each phase of the input waveform and the output line;

means for determining the frequency of the multiphase input waveform;

means for generating timing waveforms phase locked to each phase of the input waveform;

means for generating a reference waveform at a frequency equal to the fundamental frequency of the desired output waveform;

control means responsive to said timing waveform generating means, said frequency determining means and said reference waveform generating means for sequentially turning on said bidirectional switches, while the frequency of said input waveform is equal to or less than a preselected frequency, at instants when the reference waveform is equal in amplitude to a timing waveform but opposite in slope and for sequentially turning on said switches, while the frequency of said input waveform is greater than the preselected frequency, at instants when the reference waveform is equal in amplitude and has a slope of the same sense as a timing waveform.

10. The frequency changer of claim 9 wherein said control means includes first pulse means for generating a pulse each time the reference waveform is equal in amplitude but opposite in slope to each timing waveform, second pulse means for generating a pulse each time the reference waveform is equal in amplitude and slope to one of the timing waveforms, first sequencer means for sequentially turning on one bidirectional switch at a time in response to pulses from the first pulse means, second sequencer means for sequentially turning on one switch at a time in response to pulses from the second pulse means, and means for inhibiting the first sequencer means when the frequency of the input waveform is greater than said preselected frequency and for inhibiting the second sequencer when the input frequency is less than or equal to the preselected frequency.

11. The frequency changer of claim 10 for generating a multiphase output waveform including an output line for each phase of the output waveform and a bidirectional switch connected between each phase of the input waveform and each output line, and wherein said first and second sequencer means each include means for simultaneously turning on switches to separately connect the output lines to input phases which are displaced the same number of electrical degrees as the phases of the desired multiphase output waveform.

12. The frequency changer of claim 9 or 10 wherein said timing waveform generating means and said reference waveform generating means each include means for generating triangular waveforms.

13. The frequency changer of claim 9 or 10 wherein said timing waveform generator includes means for generating cosine wave timing waveforms and said reference waveform generator includes means for generating two sinusoidal reference waveforms 180° out of phase with each other and means for selecting from each reference waveform for comparison with the timing waveforms those portions which have a slope opposite in sense to the slope of the ramp function timing waveforms when the frequency of the input waveform is equal to or less than the preselected frequency and for selecting from each reference waveform for comparison with the timing waveforms those portions which have a slope which is the same in sense as the ramp function timing waveforms when the frequency of the input waveform is greater than the preselected frequency.

14. The frequency changer of claim 9 or 10 wherein said timing waveform generator includes means for generating ramp function timing waveforms and wherein said reference waveform generator includes means for generating two triangular waveforms 180° out of phase with each other and means for selecting from each reference waveform for comparison with the timing waveforms those portions which have a slope opposite in sense to the slope of the ramp function timing waveforms when the frequency of the input waveform is equal to or less than the preselected frequency and for selecting from each reference waveform for comparison with the timing waveforms those portions which have a slope which is the same in sense as the ramp function timing waveforms when the frequency of the input waveform is greater than the preselected frequency.

* * * * *